(12) United States Patent
Gareis et al.

(10) Patent No.: US 6,978,386 B2
(45) Date of Patent: Dec. 20, 2005

(54) METHOD AND APPARATUS FOR REGULATING CURRENT FOR PROGRAMMABLE LOGIC CONTROLLERS

(75) Inventors: Ronald E. Gareis, Charlottesville, VA (US); Donald A. Gates, Kents Store, VA (US); Edwin M. Thurnau, McGaheysville, VA (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 763 days.

(21) Appl. No.: 09/751,233

(22) Filed: Dec. 28, 2000

(65) Prior Publication Data

US 2002/0087895 A1 Jul. 4, 2002

(51) Int. Cl.[7] .............................................. G05F 1/40
(52) U.S. Cl. ...................... 713/300; 323/265; 323/282
(58) Field of Search ................................ 713/300, 320, 713/340; 363/123, 124; 361/103; 323/265, 323/271, 282

(56) References Cited

U.S. PATENT DOCUMENTS

| | | | |
|---|---|---|---|
| 4,553,082 A | 11/1985 | Nesler | |
| 4,634,903 A | 1/1987 | Montorfano | |
| 4,636,711 A | 1/1987 | Freymuth | |
| 4,774,450 A * | 9/1988 | Kitamura | 323/282 |
| 4,858,052 A | 8/1989 | McDonnal | |
| 5,534,771 A | 7/1996 | Massie | |
| 5,617,014 A * | 4/1997 | Danstrom | 323/267 |
| 5,748,422 A * | 5/1998 | Heaston et al. | 361/18 |
| 5,883,497 A | 3/1999 | Turnbull | |
| 6,133,757 A * | 10/2000 | Huang et al. | 326/87 |
| 6,347,028 B1 * | 2/2002 | Hausman et al. | 361/93.1 |
| 6,432,282 B1 * | 8/2002 | Shamouilian et al. | 204/228.1 |

FOREIGN PATENT DOCUMENTS

EP 0583038 2/1994

OTHER PUBLICATIONS

INPI Bureau Casalonga Et Josse, Search Report, Dec. 9, 2003, 3 pgs.

* cited by examiner

*Primary Examiner*—A. Elamin
*Assistant Examiner*—Paul Yanchus, III
(74) *Attorney, Agent, or Firm*—Armstrong Teasdale LLP

(57) ABSTRACT

A method for reducing thermal dissipation in a single PLC package includes implementing a pulse width modulated current regulator including a field effect transistor (FET) switch, and utilizing a turn on delay of the FET to provide a wide operating range of current. The FET has an inherent turn-on time delay that can be exploited such that, as the duty cycle is reduced, the FET's drain to source impedance dominates an inductive path of an output filter and increases output filtering.

27 Claims, 2 Drawing Sheets

METHOD AND APPARATUS FOR REGULATING CURRENT FOR PROGRAMMABLE LOGIC CONTROLLERS

BACKGROUND OF THE INVENTION

This invention relates generally to current regulators and, more particularly, to current regulators for programmable logic controllers (PLCs).

PLC's commonly utilize analog current regulator outputs for signaling and/or control purposes. In a typical PLC, an output stage of a linear circuit dissipates power thermally and regulates current by modulating a voltage drop caused by a loaded device in the output stage. Sometimes, a design goal will require a specified number of current outputs in a single PLC package. However, the number of current outputs is sometimes limited by the amount of power dissipated thermally. In a linear circuit, the power dissipated is the product of the current through the circuit and the voltage drop across the circuit. One known method for reducing the amount of power dissipated in a linear circuit is to replace the linear circuit with a pulse width modulated (PWM) circuit. In a PWM circuit, the current is pulsed through a saturated switch and, therefore, the voltage drop across the switch is kept low, which results in a lower product of the circuit current and voltage drop across the circuit. However, known methods and apparatus for controlling current output with a PWM current regulator only allow an output current to be variable over an eight to one range i.e., from about 150 mA to 1200 mA.

Accordingly it would be desirable to provide a PWM power output circuit for a PLC that dissipates less power than a linear circuit dissipates and allows an output current to be variable over a range greater than eight to one.

BRIEF SUMMARY OF THE INVENTION

A current regulator includes a drive circuit including a comparator and a field effect transistor (FET) switch. The drive circuit is connected to an output circuit that is connected to a feedback amplifier. The feedback amplifier is connected to an error amplifier circuit that is connected to the drive circuit. A switch duty cycle is defined as the ratio of the comparator off time versus on time because the output of the comparator determines the ratio of switch off time to switch on time for the FET. The FET has an inherent turn-on time delay that can be exploited such that, as the duty cycle is reduced, the FET's drain to source impedance dominates an inductive path of an output filter and increases output filtering. Accordingly, the dynamic increase in output filtering reduces an output ripple in proportion to output magnitude, allowing for a relatively consistent signal to noise ratio to be maintained down to near zero output levels. Therefore, the range over which the current regulator's closed loop control remains stable is expanded over known circuits.

DETAILED DESCRIPTION OF THE INVENTION

Figure 1:
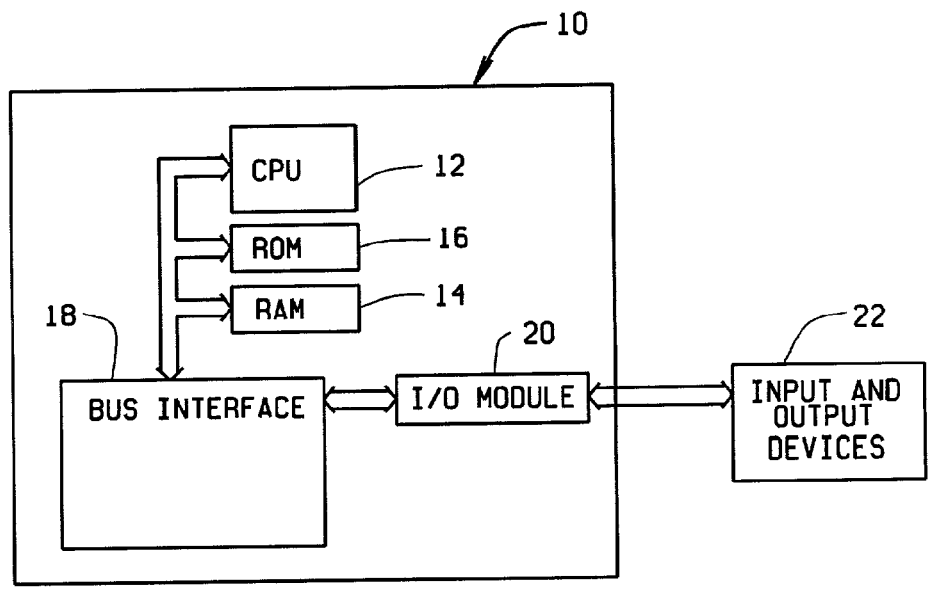
FIG. 1 is a block diagram of a PLC.

FIG. 1 is a block diagram of a PLC 10 including a central processing unit (CPU) 12, a random access memory (RAM) 14, a read only memory (ROM) 16, a bus interface 18, and an Input/Output (I/O) module 20. I/O module 20 is connected to at least one I/O device 22. In an alternative embodiment, bus interface 18 is connected to additional I/O modules, for example, an I/O module for interfacing to a motor, or an Input/Output module for receiving various input signals from devices, i.e., a switch (not shown). The additional I/O modules can be internal to PLC 10 or external. Further, I/O module 20 can be external to PLC 10.

A user program is stored in RAM 14. The user program controls operation of CPU 12 such that based, at least in part, on inputs from module 20, appropriate outputs are generated. Module 20 includes a current regulator circuit (not shown in FIG. 1) that provides a current regulated output. As explained below, the current regulator circuit provides a wide range of output such that a single current regulator can be utilized with a variety of I/O devices that have varying current demands.

Figure 2:
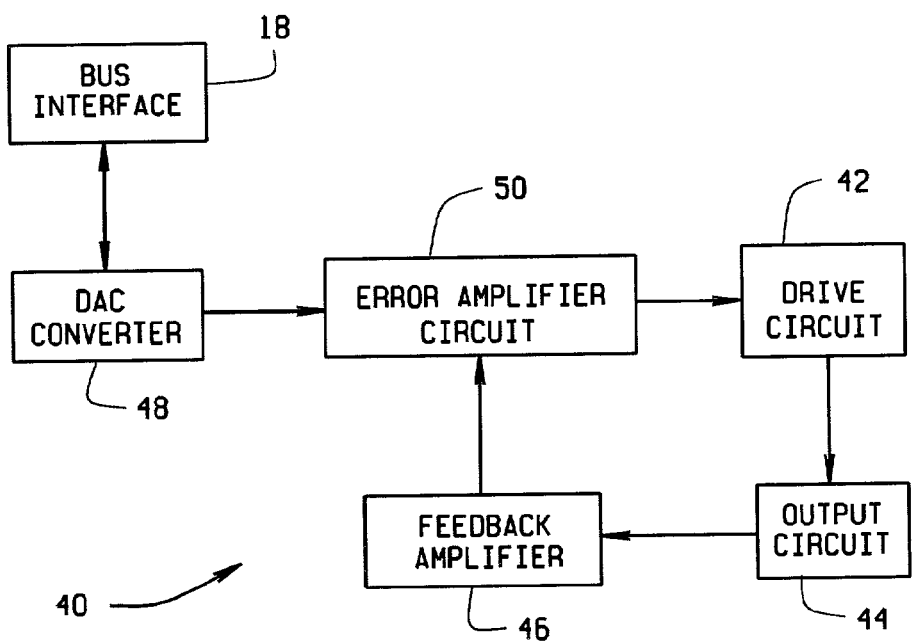
FIG. 2 is a top level schematic of a current regulator for the I/O module shown in FIG. 1.

FIG. 2 is a top level schematic of a current regulator 40 for I/O module 20 (shown in FIG. 1). Current regulator 40 includes a drive circuit 42 connected to an output circuit 44 which is connected to a feedback amplifier circuit 46. A Digital to Analog (DAC) converter 48 and Feedback amplifier circuit 46 are connected to an error amplifier circuit 50, which is connected to drive circuit 42. DAC converter 48 is further connected to bus interface 18 (shown in FIG. 1). As explained in greater detail below, feedback amplifier circuit 46 provides a feedback signal to error amplifier circuit 50 of an electrical load on output circuit 44. Error amplifier circuit 50 receives the feedback signal and compares it to a reference signal generated by DAC converter 48. Based upon the comparison, a duty cycle of drive circuit 42 is adjusted to provide a wide range of current to I/O module 20.

Figure 3:
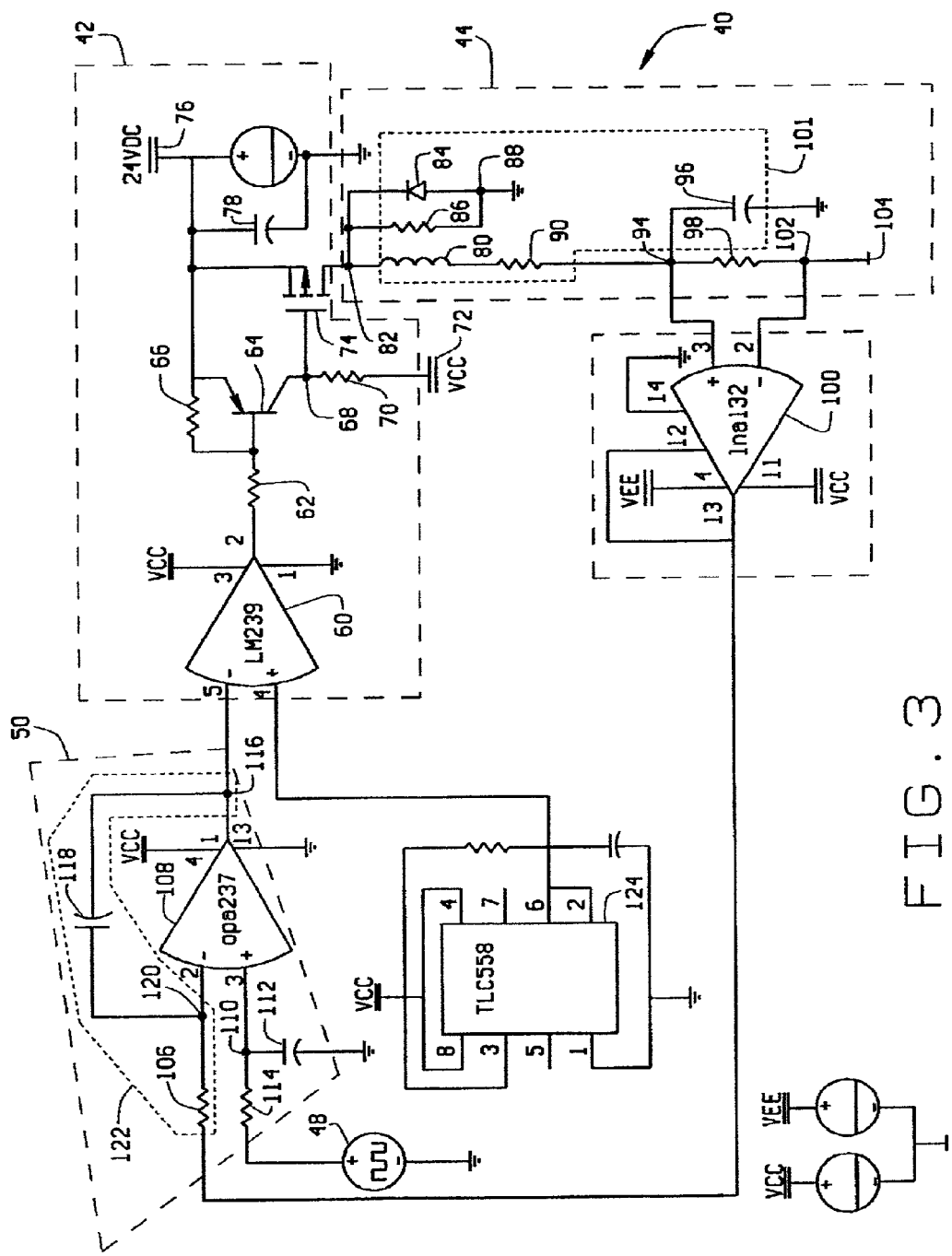
FIG. 3 is a detailed schematic of the current regulator shown in FIG. 2.

FIG. 3 is a detailed schematic of one embodiment of current regulator 40 (shown in FIG. 2) wherein elements from above are identified with the same reference numerals. Drive circuit 42 includes a comparator 60 including an output terminal connected to a first lead of a resistor 62. A second lead of resistor 62 is connected to a base of a pnp transistor 64. The emitter of transistor 64 is connected to a first lead of a resistor 66. A second lead of resistor 66 is connected to the base of transistor 64. The collector of transistor 64 is connected to a node 68 that is connected to a first lead of a resistor 70. A second lead of resistor 70 is connected to a fifteen-volt power source 72. The collector of transistor 64 is also connected to a gate of a field effect transistor (FET) switch 74 through node 68. The emitter of transistor 64 is further connected to a nominal twenty-four volt power source 76 that is filtered with a capacitor 78. Power source 76 is connected to a source lead of FET 74.

Drive circuit 42 is connected to output circuit 44 through a drain lead of FET 74. Output circuit 44 includes an inductor 80 whose first lead is connected to the drain of FET 74 at a node 82 that also connects a cathode lead of a fly back diode 84 and a first lead of a damping resistor 86 to the drain of FET 74. An anode lead of fly back diode 84 is connected to a second lead of damping resistor 86 at node 88, which is connected to ground. Diode 84 provides a current path for output circuit 44 when FET 74 is open. Output circuit 44 further includes a first lead of a damping resistor 90 connected to a second lead of inductor 80. A second lead of resistor 90 is connected to a node 94 that is connected to a first lead of a filtering capacitor 96, a first lead of a sense resistor 98, and a first input terminal of a feedback amplifier 100. Inductor 80, fly back diode 84, damping resistor 86, resistor 90, and capacitor 96 are electrically connected to form an output filter 101. A second lead of sense resistor 98 is connected to a node 102 that is connected to a second input terminal of amplifier 100 and a load terminal 104, which is available to accept a range of electrical loads.

An output terminal of feedback amplifier 100 is connected to error amplifier circuit 50 through a resistor 106. The output terminal is connected to a first lead of resistor 106. A second lead of resistor 106 is connected to a first input terminal of an error amplifier 108. A second input terminal of error amplifier 108 is connected to a node 110 that connects a first lead of a capacitor 112 to a first lead of a resistor 114. A second lead of capacitor 112 is connected to ground. A second lead of resistor 114 is connected to DAC converter 48. An output terminal of error amplifier 108 is connected to a node 116 that is connected to a first lead of a capacitor 118. A second lead of capacitor 118 is connected to a node 120 between resistor 106 and the first input terminal of error amplifier 108. The configuration of the first input terminal and the output terminal with capacitor 120 and resistor 106 form an integrator circuit 122. Node 116 is further connected to a first input terminal of comparator 60. A second input of comparator 60 is connected to a monolithic timing circuit 124 that generates and provides the second input with a fixed-frequency triangle wave.

During operation of current regulator 40, a pulsed switch current is provided at node 82. Inductor 80, damping resistor 90, and filtering capacitor 96 are electrically connected to form a lowpass filter to smooth the pulsed switch current to load terminal 104. During loading of terminal 104, sense resistor 98 has a voltage across it proportional to the current draw at terminal 104. The loading at terminal 104 can vary from less than 200 $\mu$A to more than 40 mA, which is greater than a two hundred to one ratio. The voltage across sense resistor 98 is input for amplifier 100, which is a unity gain differential amplifier and generates an output voltage equal to the voltage difference across sense resistor 98. The output voltage is a feedback signal and is applied to error amplifier 108 along with a digital-to-analog converter voltage from DAC converter 48 that is used as a reference for the feedback signal. Because the DAC voltage is used as a reference signal, the DAC voltage output determines the current output level of current regulator 40. Resistor 114 and capacitor 112 filter the DAC voltage such that step changes in the DAC voltage do not produce step changes in the output of error amplifier 108. Additionally, integrating circuit 122 provides a high direct current error gain.

The output from error amplifier 108 is utilized as a command signal and is applied to comparator 60 which compares the command signal to the fixed-frequency triangle wave. As the command signal moves up and down within the range of the triangle wave, the duty cycle of FET switch 74 is modified accordingly. The switch duty cycle is defined as the ratio of comparator 60 off time versus on time because the output of comparator 60 determines the ratio of switch off time to switch on time for FET 74. As explained below, FET 74 has an inherent turn-on time delay that can be exploited such that, as the duty cycle is reduced, FET's 74 drain to source impedance dominates an inductive path of output filter 101 and increases output filtering. Accordingly, the dynamic increase in output filtering reduces an output ripple in proportion to output magnitude, allowing for a relatively consistent signal to noise ratio to be maintained down to near zero output levels. Therefore, the range over which current regulator 40 remains stable is expanded over known circuits.

Drive circuit 42 interfaces the output of comparator 60 and FET 74 such that, at very low duty cycles, FET 74 does not turn fully on. By not letting FET 74 turn fully on, current flow through FET 74 is further impeded allowing for a greater range of possible load current values than if FET 74 was allowed to fully turn on. When pnp transistor 64 is turned on, the voltage from the source of FET 74 is applied to the gate of FET 74 causing the gate of the FET 74 to turn off. Since there is little impedance in the path between the source of FET 74 to the gate of FET 74 through transistor 64, the gate of FET 74 charges relatively quickly causing FET 74 to switch off quickly.

When pnp transistor 64 is turned off, the source of FET 74 is disconnected from the gate of FET 74 and the gate is discharged into fifteen-volt power source 72 through resistor 70. The typical value of gate capacitance for FET 74 is thirty pico-Farads which produces a time constant of 0.3 $\mu$s during turn-on and a nearly instantaneous turn-off. At a 1% duty cycle, the output from comparator 60 switches for 0.2 $\mu$s and because the turn-on time constant is 0.3 $\mu$s, FET 74 never fully turns on since the gate charge is not overcome before it is turned off and, therefore, current flow into output circuit 44 is impeded. Accordingly, current regulator 40 uses pulse width modulation and the inherent turn-on delay of FET 74 to cause drive circuit 42 to behave like a linear drive circuit at very low duty cycles, which provides a greater range of current than known circuits.

Additionally, because the current is pulsed through the saturated switch and regulated by modulating the amount of time the switch is on at other than very low duty cycles, there is a low voltage drop across the switch and the power dissipated thermally is less than with a linear output stage. Accordingly, circuit regulator 40 provides both a reduced thermal dissipation in a single PLC package and a wide operating range of current.

The present invention utilizes the non-ideal switching characteristics of a FET to provide a wide operating range of current from a pulse-width modulated current regulator in a single PLC package. Accordingly, load terminal 104 can be loaded with a current draw from less than 200 $\mu$A to more than 40 $\mu$A, which is greater than a two hundred to one ratio. Additionally, since, as explained above, the voltage drop across the switch is kept low, the power dissipated thermally is less than with a linear output stage.

While the invention has been described in terms of various specific embodiments, those skilled in the art will recognize that the invention can be practiced with modification within the spirit and scope of the claims.

What is claimed is:

1. A method for reducing thermal dissipation in a single PLC package, said method comprising the steps of:
    implementing a pulse width modulated (PWM) current regulator including a field effect transistor switch (FET); and
    utilizing a turn on delay of the FET to provide a wide operating range of current by reducing a duty cycle of the PWM current regulator.

2. A method according to claim 1 wherein said step of implementing a PWM current regulator further comprises the step of implementing a PWM current regulator including a feed-back control loop.

3. A method according to claim 1 further comprising the step of maintaining a noise to signal ratio down to an approximate near zero output level.

4. A method according to claim 1 wherein said step of utilizing a turn on delay further comprises the step of utilizing a turn on delay of the FET to provide an operating range of current of greater than ten to one.

5. A method according to claim 1 wherein said step of utilizing a turn on delay further comprises the step of utilizing a turn on delay of the FET to provide an operating range of current of greater than one hundred to one.

6. A method according to claim 1 wherein said step of utilizing a turn on delay further comprises the step of utilizing a turn on delay of the FET to provide an operating range of current of greater than two hundred to one.

7. A method for reducing thermal dissipation in a single PLC package, said method comprising:
   implementing a pulse width modulated (PWM) current regulator including a field effect transistor switch (FET);
   utilizing a turn on delay of the FET to provide a wide operating range of current; and
   utilizing the FET to dominate an inductive path of an output filter.

8. A method according to claim 7 wherein said step of utilizing the FET further comprises the step of altering an impedance between a source of the FET and a drain of the FET such that the impedance between the source and the drain dominates the inductive path of the output filter.

9. A method according to claim 1 wherein said step of utilizing a turn on delay further comprises the steps of:
   comparing a triangle wave reference signal to a command signal; and
   reducing a duty cycle in response to said comparison.

10. A circuit for reducing thermal dissipation in a single PLC package, said circuit comprising:
    a drive circuit comprising a field effect transistor (FET) including a drain and a gate, said drive circuit located within a current regulator of a programmable logic controller;
    an output circuit including a load terminal, said output circuit connected to said drain;
    a feedback amplifier connected to said output circuit; and
    an error amplifier circuit connected to said feedback amplifier and to said gate.

11. A circuit according to claim 10 wherein said drive circuit further comprises a comparator comprising a first input, a second input, and an output, said output connected to said gate of said FET, said comparator configured to adjust a duty cycle of said FET in response to a command signal applied to said first input and a triangle wave applied to said second input.

12. A circuit according to claim 10 wherein said drive circuit is configured to maintain a noise to signal ratio down to an approximate near zero output level at said load terminal.

13. A circuit according to claim 10 wherein said drive circuit is configured to utilize a turn on delay of the FET to provide an operating range of current of greater than ten to one.

14. A circuit according to claim 10 wherein said drive circuit is configured to utilize a turn on delay of the FET to provide an operating range of current of greater than one hundred to one.

15. A circuit according to claim 10 wherein said drive circuit is configured to utilize a turn on delay of the FET to provide an operating range of current of greater than two hundred to one.

16. A circuit according to claim 10 further comprising a timing circuit configured to provide a triangle wave to said drive circuit.

17. A circuit according to claim 16 wherein said timing circuit comprises a monolithic timing circuit.

18. A circuit according to claim 10 wherein said drive circuit is configured to:
    compare a triangle wave reference signal to a command signal; and
    adjust a duty cycle in response to said comparison.

19. A PLC comprising:
    a CPU;
    a bus interface operationally coupled to said CPU;
    at least one memory unit operationally coupled to said bus interface;
    at least one I/O module operationally coupled to said bus interface; and
    a current regulator operationally coupled to said I/O module, said current regulator comprising:
      a drive circuit comprising a field effect transistor (FET) including a drain and a gate, said drive circuit implemented as a pulse-width modulation circuit;
      an output circuit including a load terminal, said output circuit connected to said drain;
      a feedback amplifier connected to said output circuit; and
      an error amplifier circuit connected to said feedback amplifier and to said gate.

20. A PLC according to claim 19 wherein said drive circuit further comprises a comparator comprising a first input, a second input, and an output, said output connected to said gate of said FET, said comparator configured to reduce a duty cycle of said FET in response to a command signal applied to said first input and a triangle wave applied to said second input.

21. A PLC according to claim 19 wherein said drive circuit is configured to maintain a noise to signal ratio down to an approximate near zero output level at said load terminal.

22. A PLC according to claim 19 wherein said drive circuit is configured to utilize a turn on delay of the FET to provide an operating range of current of greater than ten to one.

23. A PLC according to claim 19 wherein said drive circuit is configured to utilize a turn on delay of the FET to provide an operating range of current of greater than one hundred to one.

24. A PLC according to claim 19 wherein said drive circuit is configured to utilize a turn on delay of the FET to provide an operating range of current of greater than two hundred to one.

25. A PLC according to claim 19 wherein said current regulator further comprises a timing circuit configured to provide a triangle wave to said drive circuit.

26. A PLC according to claim 25 wherein said timing circuit comprises a monolithic timing circuit.

27. A PLC according to claim 19 wherein said drive circuit is configured to:
    compare a triangle wave reference signal to a command signal; and
    adjust a duty cycle in response to said comparison.

* * * * *